United States Patent [19]

Schirmer

[11] 4,349,044

[45] Sep. 14, 1982

[54] NON-RETURN DEVICE AT THE SCREWHEAD OF SCREW INJECTION MOLDING MACHINES

[75] Inventor: Karl Schirmer, Nuremberg, Fed. Rep. of Germany

[73] Assignee: Mannesmann Demag Kunststofftechnik Zweigniederlassung der Mannesmann Demag Aktiengesellschaft, Nuremberg, Fed. Rep. of Germany

[21] Appl. No.: 197,804

[22] Filed: Oct. 17, 1980

[30] Foreign Application Priority Data

Oct. 19, 1979 [DE] Fed. Rep. of Germany ....... 2942317
Aug. 21, 1980 [DE] Fed. Rep. of Germany ....... 3031502

[51] Int. Cl.³ .............................................. B29F 1/04
[52] U.S. Cl. ................................ 137/512.3; 137/528; 417/459; 417/513; 425/562
[58] Field of Search ............................ 137/512.3, 528; 417/458, 459, 511, 513; 425/542, 557, 562, 564, 146

[56] References Cited

U.S. PATENT DOCUMENTS

| 219,754 | 9/1879 | Newman | 417/511 |
|---|---|---|---|
| 3,007,202 | 11/1961 | Wucher | 425/562 X |
| 3,319,299 | 5/1967 | Kiraly | 425/564 X |
| 3,558,244 | 1/1971 | Uchiyama | 417/511 |

FOREIGN PATENT DOCUMENTS

| 1921058 | 11/1970 | Fed. Rep. of Germany | 425/562 |
|---|---|---|---|
| 2719497 | 11/1978 | Fed. Rep. of Germany | 425/562 |

*Primary Examiner*—Robert G. Nilson

[57] ABSTRACT

In a screw injection molding machine comprising a non-return device at the screwhead, said device comprising a pressure ring which is displaceable on the screwhead between front and rear abutments, is guided in the cylinder by its outer periphery and defines a flow gap with its inner periphery, a check valve for closing the flow gap against reverse flow is disposed near the front of the pressure ring whereby to facilitate rapid response of the non-return device without loss of material and obtain a substantially constant weight of injected material, particularly in the case of materials of low viscosity. The check valve may comprise a lightweight washer or valve ring.

10 Claims, 5 Drawing Figures

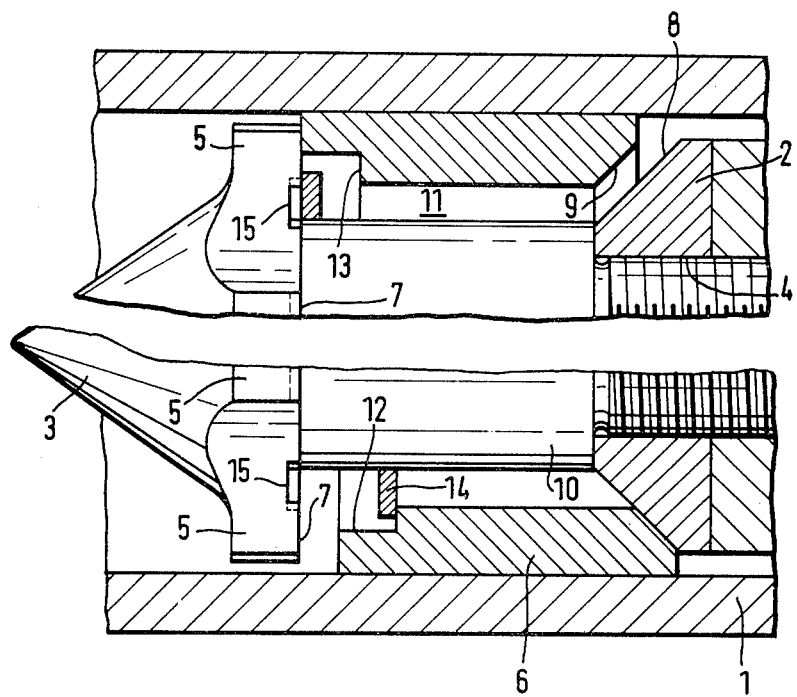
FIG. 1a
FIG. 1b
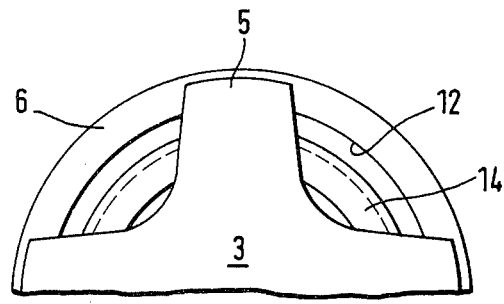
FIG. 2

NON-RETURN DEVICE AT THE SCREWHEAD OF SCREW INJECTION MOLDING MACHINES

The invention relates to a non-return device at the screwhead of screw injection moulding machines, comprising a pressure ring which is freely displaceable on the screwhead between a front and a rear abutment, has its outer periphery guided on the interior surface of the cylinder, leaves a flow gap at its inner periphery for the material to be injected, e.g. plasticized plastics material, and has a sealing face co-operating with the rear abutment.

Non-return devices of the aforementioned kind are well known and used. During the phase when the substance is conveyed forwardly into the collecting chamber by the screw, the pressure ring displaceable between the two abutments is pressed against the front abutment under the action of the resulting throttling resistance, so that the sealing face of the pressure ring is spaced from the rear abutment face. The substance can thus travel through the flow gap and be conveyed to the collecting chamber through apertures provided in the front abutment face. During the injection stroke, however, the pressure ring is displaced right up to the rear abutment under the influence of the substance flowing into the flow gap, whereby a seal is established at the rear abutment. Reverse flow into the convolutions of the screw of the substance located in the collecting chamber of the injection cylinder is thereby prevented.

A disadvantage common to all known non-return devices of this kind is that the closing operation of the non-return device will take a more or less long period depending on the viscosity of the material to be injected, fluctuations in the closing time also being unavoidable from one injection to another. It follows that, particularly in the case of materials of low viscosity, marked quantities of the substance will return to the screw convolutions before the non-return device is finally closed, whereby the amount of material injected will fluctuate from one injection to another and there will be corresponding differences in the quality of the moulded products. There have been various suggestions for shortening the closing time of non-return devices of the kind here in question without impeding the flow of substance between the opened sealing faces and the flow gap. However, only partial success has so far been obtainable in practice.

It is the object of the invention to provide a structurally simple manner of rapidly closing non-return devices whereby the loss of material of even low viscosity is avoided during the injection stroke and the weight of injected material is therefore substantially constant.

According to the invention, a check valve for closing the flow gap against reverse flow is provided near the front of the pressure ring.

In the non-return device of the invention, the pressure ring continues to have the function of preventing the reverse flow of substance into the convolutions of the screw and it is therefore sealingly guided along the interior surface of the cylinder as hitherto. However, the pressure ring additionally has a check valve near its end facing the head of the screw. This check valve reacts practically in the same way as a pilot valve during the injection stroke and closes the flow gap against reverse flow.

Since the check valve does not have any sealing function in relation to the interior surface of the cylinder, it can be comparatively light in weight and therefore respond to very small pressure differences. Since the check valve closes the flow gap, the pressure ring is not pushed to the closing position by the material flowing through the flow gap under the throttling effect but solely by the pressure difference between the collecting chamber and the screw convolutions set up during the injection stroke.

In a preferred embodiment of the invention, the check valve is formed by a freely movable washer which is disposed on the screwhead coaxially with the pressure ring and co-operates with a front sealing face of the pressure ring as a valve seat. The washer is loosely displaceable on the shank of the screwhead and is guided thereby. Its diameter is only slightly larger than the internal diameter of the pressure ring so that it can come to lie against the end of the pressure ring.

When the non-return device is open, to facilitate abutment of the pressure ring against the front abutment, which is normally formed by radial arms, a recess for receiving the washer is provided either in the front abutment or in the front of the pressure ring.

According to another advantageous embodiment, the check valve is formed by a freely movable ring which is disposed on the screwhead coaxially with the pressure ring, co-operates with a front sealing face of the pressure ring as a valve seat, and is of streamlined shape in the direction of travel of the material to be injected.

The check valve of such an embodiment offers a comparatively large resistance in its closing direction and suppresses reverse flow of material as far as possible. On the other hand, the flow of material is impeded as little as possible during the phase in which material is conveyed into the collecting chamber in front of the screwhead as the screw is slowly moved back. By reason of the streamlined shape of the ring in the conveying direction of the material, it offers a low resistance of the flow of material and therefore a low tractive force is exerted on the ring and on the pressure ring. During this phase, therefore, neither the valve ring nor the pressure ring is pressed with an excessive force against the front abutment of the screwhead, whereby wear is reduced. In the opposite direction, however, a streamlined shape is not important because during the advancing motion of the screw when executing its injection stroke even a short displacement is desired to lead to a build-up which applies the ring to the front sealing face of the pressure ring and closes the flow gap.

In an embodiment which is advantageous from the point of view of manufacture and assembly, the valve ring has a cross-sectional shape in the form of a regular trapezium with equal base angles.

Additional advantages and features of the present invention will become evident from the following description of preferred examples with reference to the accompanying drawings, wherein:

FIG. 1a is a longitudinal elevation, partly in section, of a segment of a non-return device according to the invention in an open position;

FIG. 1b is a similar view in a closed position;

FIG. 2 is an elevation of the screwhead and non-return device of FIG. 1, and

Figure 3A:
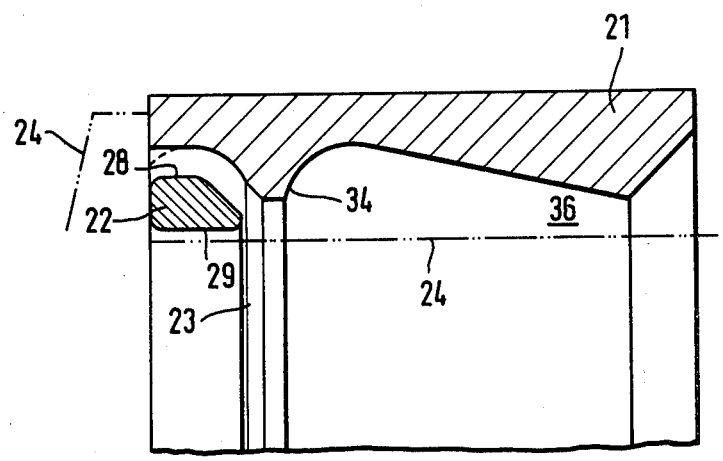
FIG. 3a is an axial section through a modified form of non-return device in an open position.

In FIG. 1, the injection unit (not shown) comprises an injection cylinder 1 in which a screw 2 is rotatably and axially displaceably mounted in known manner. The injection unit is adapted to process plastics materials as well as ceramic materials. The screwhead 3 is formed by a separate part which is screw-connected to the screw 2 at 4. The screwhead 3 in the illustrated example has an acute conical tip which diverges towards radial arms 5. There are four circumferentially uniformly distributed radial arms 5 of which the rear faces 7 serve as a front abutment for a pressure ring 6.

The pressure ring 6 is sealingly displaceably guided on the interior surface of the injection cylinder 1. Its displacement is limited by the front abutment formed by the faces 7 and a rear abutment formed by a conical sealing face 8 on the screw 2 against which the pressure ring 6 can be seated with a complementary conically shaped sealing face 9.

An annular flow gap 11 for the substance to be injected is formed between the inner periphery of the pressure ring 6 and the shank 10 of the screwhead 3. The top half of FIG. 1 shows the pressure ring 6 abutting the front abutment 7 so that substance can flow between the sealing faces 8 and 9, through the flow gap 11 and between the radial arms 5. The lower half of FIG. 1 shows the condition in which the non-return device is closed, i.e. the pressure ring 6 has been displaced to lie against the rear abutment so that the sealing faces 8, 9 are in contact.

A recess 12 extends from the front end of the pressure ring 6 and has a diameter only slightly larger than the internal diameter of the pressure ring 6. The end face 13 of this recess that is set back forms an abutment face for a washer 14 of which the diameter is again slightly larger than the internal diameter of the pressure ring 6. The washer 14 is axially displaceable on the shank 10 of the screwhead 3 and can therefore move freely between the abutment 7 and the end face 13. In the radially inner zone of the radial arms 5, i.e. at the place where the washer 14 comes to lie on the faces 7 in the projected position, the faces 7 are locally relieved by machined recesses 15 to prevent the washer 14 from clinging or adhering to the radial arms 5.

The function of the non-return device according to the invention and particularly of the check valve formed by the washer 14 is as follows:

During that phase of the injection cycle in which the material is conveyed by the screw 2 into the collecting chamber of the cylinder 1 disposed in front of the screwhead 3, the forces exerted by the substance on the pressure ring 6 cause the pressure ring to be displaced into the position shown in the upper half of FIG. 1, where the pressure ring 6 abuts the front abutment 7. The substance can therefore reach the collecting chamber between the sealing faces 8, 9, through the flow gap 11 and between the apertures between the radial arms 5. At this stage the washer 14 is likewise in its foremost position into which it has been pushed by the flowing substance. The washer abuts the abutment faces 7 of the radial arms 5.

On commencement of the injection stroke, the screw 2 is moved axially forwardly in known manner. This reverses the pressure gradient in the substance to be injected, i.e. the substance seeks to flow back out of the collecting chamber, through the flow gap 11 into the screw convolutions. However, even with a very small pressure gradient emanating from the collecting chamber the washer 14 is displaced rearwardly in the manner of a check valve and comes to lie against the end face 13 of the recess 12 in the pressure ring 6. Since this blocks the flow gap 11, the pressure ring 6 will immediately act as a piston in the injection cylinder 1. By reason of the rapidly increasing pressure gradient from the front to the back during the injection stroke, the pressure ring 6 is therefore rapidly moved against the rear abutment, the displacement taking place solely as a result of the pressure drop. Since the flow gap 11 is closed, there is no reverse flow of substance after the washer 14 lies against the end face 13.

The machined relief 15 on the radial arms 5 prevents a suction effect from being exerted on the washer 14 that could otherwise impede its displacement towards the end face 13.

The recess 12 in the pressure ring 6 can, instead of the perpendicular transition between the end face 13 and the adjoining surface of the cylinder, have a conical or rounded surface to avoid a dead space. In addition, or in place of the recess 12 in the pressure ring, a corresponding recess can be formed in the radial arms 5 at a depth such that the pressure ring 6 can abut the abutment faces 7 without hindrance. Since the washer 14 is subjected to comparatively low stresses, its mass can be reduced by making it from a lighter material than the pressure ring 6. This enhances the rapid response of the non-return device.

Figure 3B:
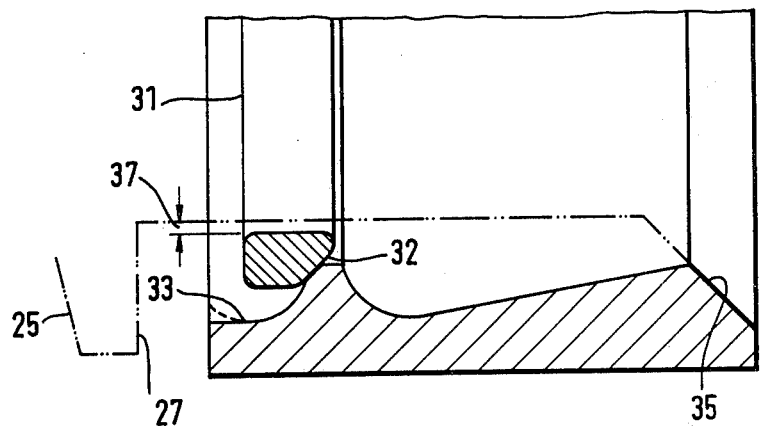
FIG. 3b is a similar view in a closed position.

FIG. 3 is an axial cross-section through the important components of a modified non-return device, namely through the pressure ring 21 and the valve ring 22 which forms the check valve together with the front sealing face 23. In the upper half of the drawing, the check valve is in the open position and in the lower half in the closed position. The screwhead with radial arms 25 is shown in chain-dotted lines (with double dots), the rear faces 27 of the radial arms serving as front abutments for the front end of the pressure ring 21.

As will be evident from the drawing, the cross-sectional shape of the valve ring 22 is substantially trapezoidal with parallel sides 28, 29 extending parallel to the axis 30 of the screw. The front end face 31 of the valve ring 22 is substantially normal to the axis 30. At the rear, the valve ring 22 has a conical face which is complementary to the front sealing face 23 of the pressure ring 21. The transitions from the peripheral surfaces 28, 29 to the end faces 31, 32 of the valve ring 22 are rounded in streamlined manner.

The valve ring 22 is received in a recess 33 of which the contour is similar to the cross-sectional shape of the valve ring 22. In the open position of the check valve, therefore, a flow passage is formed which offers little resistance. However, as will be explained hereinafter, since the resistance to flow offered by the pressure ring 21 in the flow gap can in any case be kept very low, it is possible to constrict the recess 33 somewhat forwardly as is shown in chain-dotted lines. One thereby obtains a larger end face for the pressure ring 21 and this has a beneficial effect on wear.

The front sealing face 23 is provided on an inwardly projecting collar 34 of the pressure ring 21. The flow gap 36 extending from the rear sealing face 35 of the pressure ring 21 diverges towards this collar. Despite the constriction of the flow gap 36 constituted by the collar 34, the tractive force exerted on the pressure ring 21 during flow of the substance through the flow gap 36 is less than in the case of known non-return devices.

The annular gap 37 between the peripheral surface of the screwhead 24 and the inner surface of the valve ring 22 is somewhat exaggerated in the drawing. In practice, a suitable width for the annular gap is about 1.2 to 1.7% of the internal diameter of the valve ring 22. In a non-return device having the dimensions shown in the drawing (D=130 mm), this will give a width of 1 to 1.5 mm for the annular gap 37. With smaller screw diameters, e.g. D=40 mm, the width for the annular gap is about 0.5 mm. The axial length of the valve ring 22 amounts to about 15 mm in the illustrated example. This dimension for the valve ring 22 and the annular gap 37 has also proved successful in the case of very low-viscous plastics materials for achieving very rapid closing times of the non-return device.

The conical enlargement of the flow gap 36 as shown in FIG. 3 is by no means essential. It is clearly possible to make the diameter of the front sealing face 23 so large to begin with that a comparatively wide flow gap 36 of cylindrical shape is obtained. However, the illustrated embodiment has the advantage that a large flow gap 36 is obtained relatively to the screw diameter without weakening the screwhead 14. In addition, the non-return device of existing screw injection moulding machines can be readily modified to this shape and equipped in the manner of the present invention.

Further, it is not essential to have the illustrated cross-sectional shape for the valve ring 22 in the form of a trapezium with unequally long non-parallel sides. A construction in which the cross-section of the valve ring 22 has the shape of a regular trapezium with equal base angles at the non-parallel sides has the advantage of preventing wrong insertion of the valve ring during assembly. With appropriate choice of this base angle, one will always obtain the most streamlined shape for this valve ring in the direction of flow without prescribing a special position for the valve ring.

I claim:

1. In a screw injection moulding machine having an injection cylinder and a screw rotatable and reciprocable within said cylinder and provided with a screwhead, a non-return device at the screwhead comprising a pressure ring freely displaceable between front and a rear abutments and which is slidably guided by its outer periphery on the interior surface of the injection cylinder and leaves a flow gap at its inner periphery for material to be fed therethrough by the screw, the pressure ring further having a rear sealing face co-operating with said rear abutment, the improvement comprising a front sealing face on the pressure ring cooperating with said front abutment and an annular check valve substantially coaxial with the pressure ring so disposed in the space between said front abutment and the front sealing face of the pressure ring as to close said flow gap when said check valve is applied to said front sealing face.

2. The non-return device of claim 1, wherein the check valve is in the form of a freely movable washer.

3. The non-return device of claim 2, wherein the washer is received in a recess in a front end face of the pressure ring when the pressure ring abuts against said front abutment.

4. The non-return device of claim 2, wherein the washer is of lightweight metal.

5. The non-return device of claim 1, wherein the check valve is in the form of a freely movable ring of predetermined length along an axis thereof which is disposed on the screwhead coaxially with the pressure ring and is of streamlined shape in the direction of travel of the material to be injected and flowing through said flow gap.

6. The non-return device of claim 5, wherein the rear of the check valve ring has a conical surface co-operating with a complementary front sealing face on the pressure ring.

7. The non-return device of claim 5, wherein the check valve ring has a substantially trapezoidal cross section, the parallel sides of the trapezoidal cross section extending parallel to said axis and the larger said side being disposed in the inner periphery of the ring.

8. The non-return device of claim 5, wherein the check valve ring is received in a recess in a front end face of the pressure ring, said recess having a shape substantially similar to that of the ring cross section.

9. The non-return device of claim 1, wherein the flow gap defined between the inner periphery of the pressure ring and the screwhead diverges in the direction of travel of the material to be injected.

10. The non-return device of claim 9, wherein the flow gap diverges towards a collar which projects inwardly from the inner surface of the pressure ring and carries the front sealing face.

* * * * *